United States Patent
Root et al.

(10) Patent No.: US 7,593,031 B2
(45) Date of Patent: Sep. 22, 2009

(54) INTEGRATED DESKTOP VIDEOCONFERENCING SYSTEM

(75) Inventors: Timothy Root, Nashua, NH (US); Anthony M Duys, Merrimac, MA (US); Daniel R Phelps, N. Conway, NH (US)

(73) Assignee: Polycom, Inc., Pleasanton, CA (US)

( * ) Notice: Subject to any disclaimer, the term of this patent is extended or adjusted under 35 U.S.C. 154(b) by 727 days.

(21) Appl. No.: 11/108,015

(22) Filed: Apr. 15, 2005

(65) Prior Publication Data
US 2005/0231587 A1    Oct. 20, 2005

Related U.S. Application Data

(60) Provisional application No. 60/563,181, filed on Apr. 16, 2004.

(51) Int. Cl.
*H04N 7/14* (2006.01)
*H04M 9/00* (2006.01)

(52) U.S. Cl. .............. 348/14.07; 348/14.08; 348/14.04

(58) Field of Classification Search ... 348/14.01–14.09, 348/14.1, 14.11–14.16; 709/204; 370/260–261; 379/434, 436, 440, 454
See application file for complete search history.

(56) References Cited

U.S. PATENT DOCUMENTS

| | | | | |
|---|---|---|---|---|
| 4,258,387 | A | 3/1981 | Lemelson et al. | 348/14.01 |
| 5,335,011 | A | 8/1994 | Addeo et al. | 348/14.01 |
| 5,612,732 | A | 3/1997 | Yuyama et al. | 348/14.01 |
| 5,764,278 | A | 6/1998 | Nagao | 348/14.01 |
| 6,323,893 | B1* | 11/2001 | Tosaya | 348/14.08 |
| 6,335,753 | B1 | 1/2002 | McDonald | 348/14.01 |
| 6,667,759 | B2 | 12/2003 | Gerszberg et al. | 348/14.01 |
| 6,710,797 | B1* | 3/2004 | McNelley et al. | 348/14.16 |
| 6,727,918 | B1* | 4/2004 | Nason | 715/791 |
| 2002/0018117 | A1* | 2/2002 | Tosaya | 348/14.08 |
| 2004/0041902 | A1* | 3/2004 | Washington | 348/14.01 |

FOREIGN PATENT DOCUMENTS

| | | |
|---|---|---|
| EP | 998144 A2 | 5/2000 |
| JP | 11289525 A | 10/1999 |

OTHER PUBLICATIONS

"Education Data Sheet: Classmate Mobile Educational Center by Zydacron" (publication date unknown).

Information re: Scotty Mobile system by Scotty TeleTransport Corporation (original publication date unknown) (downloaded from Http://www.scotty.at/cms/cms.php?pageld=23).

(Continued)

*Primary Examiner*—Melur Ramakrishnaiah
(74) *Attorney, Agent, or Firm*—Wong, Cabello, Lutsch, Rutherford & Brucculeri, L.L.P.

(57) ABSTRACT

Disclosed herein is a videoconferencing system that has been integrated into a flat panel display or computer monitor. The integration provides an improved form factor for the videoconferencing system. In addition, the integration offers the dual use as a computer monitor and as a videoconferencing system. The system includes a videoconferencing module attaching to a back of the flat panel display. The videoconferencing module has videoconferencing electronics that electronically connect to integral electronics of the display. The system also includes a microphone/camera module attaching to a top of the flat panel display. The microphone/camera module has a camera and microphone that both electronically connect to the videoconferencing electronics.

24 Claims, 7 Drawing Sheets

OTHER PUBLICATIONS

Information re: Scotty ProMax system by Scotty TeleTransport Corporation (original publication date unknown) (downloaded from Http://www.scotty.at/cms/cms.php?pageld=25).

Information re: Scotty Secure Multi-Function Unit system by Scotty TeleTransport Corporation (original publication date unknown) (downloaded from Http://www.scotty.at/cms/cms.php?pageld=28).

Information re: Scotty Warp2 system by Scotty TeleTransport Corporation (original publication date unknown) (downloaded from Http://www.scotty.at/cms/cms.php?pageld=7&newsld=12).

"Scotty Remote Medicine" (publication date unknown).

"Scotty in Peace Keeping Applications" (publication date unknown).

"Scotty Tele-Transport Corporation—Advanced Mobile Communication Products and Solutions" (original publication date unknown) (downloaded from Http://www.army-technology.com/contractors/navigation/scotty/index.html).

"Tandberg Launches Revolutionary Videoconferencing Product, the Tandberg 1000," Oslo Norway, Jan. 30, 2001 (downloaded from Http://www.tandberg.net/tb.asp?s=pressrelease&aid={0F50C153-. . ..}).

Tandberg 1000 User Manual (copyright 2003).

"Tandberg's New Videoconferencing System Brings Wireless Capabilities and Enhanced Security to Set-Top Market" Oslo Norway, Apr. 22, 2002 (downloaded from Http://www.tandberg.net/tb.asp?s=pressrelease&aid={49C9D58A-. . ..}).

"Tandberg Introduces Briefcase-Sized Portable State-of-the-Art Videoconferencing System," New York, USA, May 12, 2003 (downloaded from Http://www.tandberg.net/tb.asp?s=pressrelease&aid={72262E32-. . ..}).

"Virtual Presence System" by Marconi, obtained from www.marconi.com, generated Jun. 3, 2005, 2-pages.

Brochure entitled "Be there- from anywhere: ViPr™ Virtual Presence," downloaded from www.marconi.com, undated, 8-pages.

Data Sheet entitled "ViPr™ Virtual Presence," downloaded from www.marconi.com, copyright 2004, 8-pages.

Data Sheet entitled "ViPr™Virtual Presence Component Options," downloaded from www.marconi.com, copyright 2004, 4-pages.

Application Note entitled "ViPr™ Virtual Presence," downloaded from www.marconi.com, copyright 2004, 4-pages.

\* cited by examiner

INTEGRATED DESKTOP VIDEOCONFERENCING SYSTEM

CROSS-REFERENCE TO RELATED APPLICATIONS

This application claims priority to U.S. Provisional Application Ser. No. 60/563,181 filed Apr. 16, 2004, which is incorporated herein by reference in its entirety.

BACKGROUND OF THE INVENTION

1. Field of the Invention

The present invention relates generally to a videoconferencing system, and more particularly to a videoconferencing system integrated into a computer display.

2. Description of Related Art

Prior to around 1988, videoconferencing systems were too large to build into a cart. Videoconferencing systems were designed into custom rooms for, with the equipment placed in equipment closets, or otherwise concealed in custom furniture (shelves, etc). For example, the original PictureTel product (the C2000) weighed in excess of 250 pounds. This was only the codec, it did not include audio amplification/echo cancellation, video switching equipment, or the network interfaces needed to connect to the WAN.

Around 1988, standalone codec technology, echo cancellation systems, monitors, cameras, standalone network interface units were integrated into carts. For PictureTel the first such unit was the V2100. The C3000 codec was used in these systems, which was functionally equivalent to the C2000 system, but weighed around 72 lbs. The unit was massive. The second generation unit (the V3100) had a cabinet that weighed 240 lbs, electronics (including the codec) added another 240 lbs, the monitor added about another 120 lbs-700 lbs altogether.

In about 1991, fully integrated cart systems were introduced. In these systems, there was a camera element, a monitor, and a single electronics module. In the case of the S4000 model by PicutreTel, there was at least one model that completely integrated the electronics module into the base of the cart. The S4000 model 400 was functionally equivalent to the V3100, but weighed "only" 200 lbs (not including monitor). The electronics module weighed only 45 lbs, compared to 240 lbs in the V3100. A good chunk of the cart weight was to keep the cart from tipping when a heavy monitor was placed on the top.

In 1996, the Swiftsite (again PictureTel) was the first set-top unit. The electronics module and the camera were integrated into a unit small enough to place on top of the monitor, thereby eliminating the need for a cart at all. Swiftsite weighed in at 10 lbs. Today, even this form factor is becoming large and unwieldy compared to advances in flat panel displays and computer monitors. Additionally, the need for videoconferencing equipment has moved from custom designed and built conference rooms to individual offices. Therefore, what is needed is an even smaller videoconferencing form factor that better integrates with its surroundings in a modern office.

SUMMARY OF THE DISCLOSURE

Disclosed herein is a videoconferencing system that has been integrated into a flat panel display or computer monitor. The integration provides an improved form factor for the videoconferencing system. In addition, the integration offers the dual use as a computer monitor and as a videoconferencing system. The system includes a videoconferencing module attaching to a back of the flat panel display. The videoconferencing module has videoconferencing electronics that electronically connect to integral electronics of the display. The system also includes a microphone/camera module attaching to a top of the flat panel display. The microphone/camera module has a camera and microphone that both electronically connect to the videoconferencing electronics.

The foregoing summary is not intended to summarize each potential embodiment or every aspect of the present disclosure.

BRIEF DESCRIPTION OF THE DRAWINGS

The foregoing summary, preferred embodiments, and other aspects of the subject matter of the present disclosure will be best understood with reference to a detailed description of specific embodiments, which follows, when read in conjunction with the accompanying drawings, in which.

While the disclosed integrated desktop videoconferencing system is susceptible to various modifications and alternative forms, specific embodiments thereof have been shown by way of example in the drawings and are herein described in detail. The figures and written description are not intended to limit the scope of the inventive concepts in any manner. Rather, the figures and written description are provided to illustrate the inventive concepts to a person skilled in the art by reference to particular embodiments, as required by 35 U.S.C. § 112.

DETAILED DESCRIPTION

Figure 1:
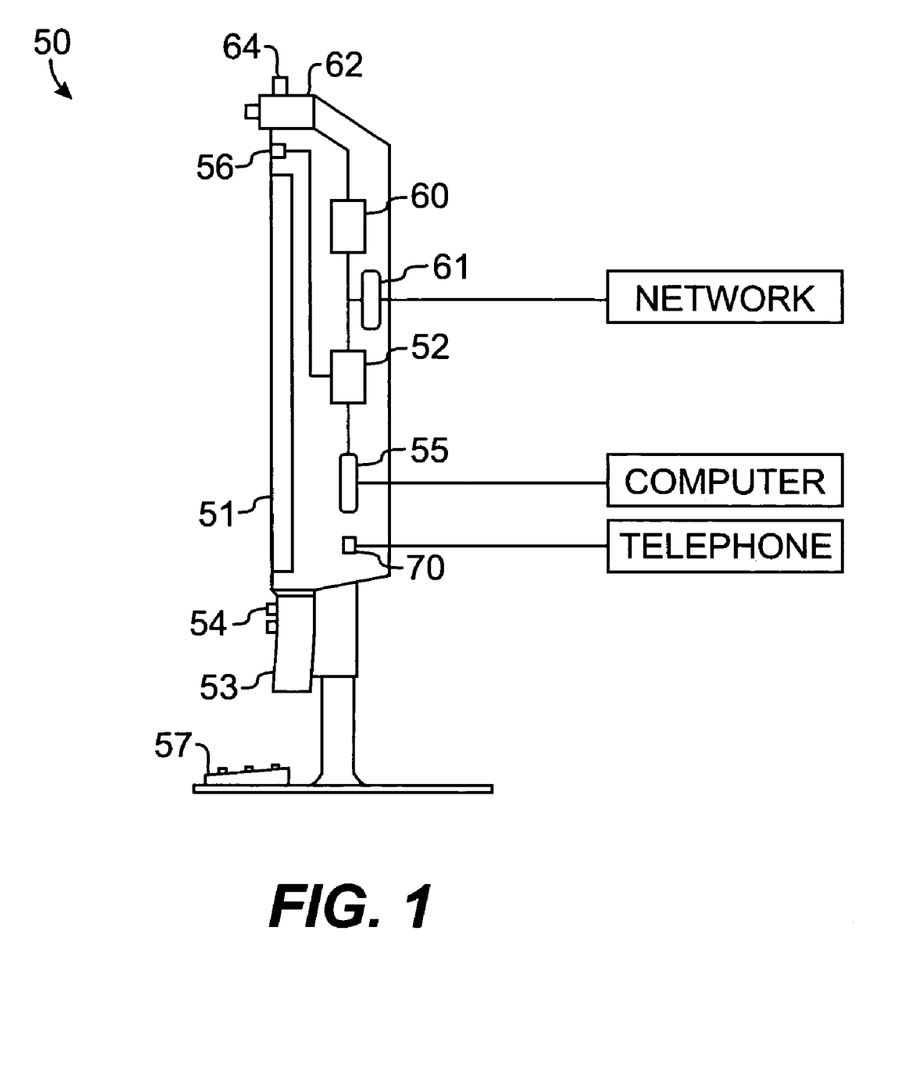
FIG. 1 schematically illustrates an integrated desktop videoconferencing system in accordance with certain teachings of the present disclosure.

Referring to FIG. 1, an integrated desktop videoconferencing system 50 in accordance with certain teachings of the present disclosure is schematically illustrated in a side view. The videoconferencing system 50 includes a display 51, display and audio electronics 52, one or more speakers 53, videoconferencing electronics 60, a camera 62, and one or more microphones 64. The display 51 is preferably a flat panel, LCD-type personal computer monitor. The display and audio electronics 52 are integral to the display 51 and can be similar to those found in a PC type monitor. The videoconferencing electronics 60 are mounted on the system 50 for conducting videoconferencing. Electronics for videoconferencing are known in the art so that details are not described herein.

The videoconferencing unit 60 has a network connection 61 for connecting to a network for videoconferencing. Details of such network connections for videoconferencing are known in the art and are not described herein. The videoconferencing electronics 60 are connected to the integral electronics 52 of the display 51 so that the display 51 can show images of a video conference and the speakers 53 can produce the audio of the conference.

The camera 62 is mounted on the system 50 for obtaining images of a user and is electronically connected to the videoconferencing electronics 60. The camera 62 can be stationary, but the camera 62 is preferably capable of pan, tilt, and/or zoom operation. Accordingly, the camera 62 can have either a manual pan/tilt/zoom mechanism or alternatively electrically driven pan/tilt/zoom mechanism. Subsets of these operations, such as pan and tilt only may also be provided. As still another alternative, electronic pan and tilt may be provided for the camera 62 as described in co-pending and co-owned U.S. patent application Ser. Nos. 09/141,057 and 10/425,535, which are hereby incorporated by reference in their entireties.

Finally, the microphone 64 is mounted on the system 50 for obtaining audio for the video conference and is electronically connected to the videoconferencing unit 60. Preferably, more than one microphone 64 is used with the system 50, and the microphones 64 are directed toward the front of the display 51 to obtain audio from the user at the display 51.

Preferably, the display 51 includes function buttons 54 for controlling various functions of both the display 51 and other portions of the videoconferencing system 50. Among the functions controlled by the function buttons 54 are: a display mode (source switch) function, a display setup function, a speaker volume function, and a power switching (on/off) function. The button 54 for the display mode function allows the user to select the operation of the system between a computer monitor mode and a videoconferencing mode. The button 54 for the display setup function allows the user to enter a menu driven system of the display 51 in which various parameters of the display 51 and/or other portions of the videoconferencing system 50 may be manipulated. The button 54 for the power switching function preferably provides independent power switching to allow the computer display 51 to be used independently of other portions of the videoconferencing system 50.

The videoconferencing system 50 described herein can be used additionally as a personal computer monitor. Accordingly, the display 51 includes a video input 55 (e.g., VGA input) for receiving the video signal from a personal computer. In addition, the integrated desktop videoconferencing system 50 also preferably includes a video output (e.g., VGA output) (not shown), which allows the connection of an additional monitor or display (not shown). This additional display may be used for use in a multiple-display videoconferencing mode, for example, a mode in which one monitor displays the participants at a remote location and the other monitor displays documents, such as a computer-based presentation. Multi-monitor videoconferencing systems are known to those skilled in the art, and therefore details of such systems are not reproduced here. Additionally, a video source passthrough (not shown) may be included with the electronics 52 of the display 51 so that the image displayed on the display 51 may be shown on an additional display. Additional combinations of display modes are possible and would be apparent to one skilled in the art having the benefit of this disclosure. Furthermore, it is also possible to use the display 51 in accordance with other video signal standards, and thus the videoconferencing system 50 may include other forms of video signal inputs, such as an S-Video input, a composite video input, a DVI input, and/or a component video input. Any and all of these and a variety of other video formats are adaptable for use with the system 50.

It is also possible for the audio components of the integrated desktop videoconferencing system 50 to be used to provide PC audio functionality. Obviously, this necessitates some form of audio input (not shown), various forms of which are known to those skilled in the art. Additionally, it is preferable to provide a headset plug (not shown) on the front bezel of display 51, so that a user may use the audio functions of the videoconferencing system 50 and/or personal computer without disturbing others in the vicinity and/or with improved privacy.

The display 51 also preferably includes an integrated infrared detector 56 and associated electronics in the integral electronics 52 of the display. (In a preferred embodiment described below, the display 51 is an LCD computer monitor that also functions as an LCD television in which a remote control is practically a standard feature.) The infrared detector 56 allows an infrared remote control to control various features of the display 51 and/or the videoconferencing system 50. However, the videoconferencing system 50 described herein may also be used in conjunction with displays lacking an infrared detector, or this functionality may be provided on the system 50 by separately integrating infrared receiver electronics with the videoconferencing electronics 60, for example.

Further additional features may also be included advantageously in the integrated desktop videoconferencing system 50 disclosed herein. For example, the base of the display 51 may include a dialing pad 57 to facilitate the placement of video and/or audio calls with the system 50. Additionally, the videoconferencing system 50 may include a telephone jack 70 for connection of a standard telephone extension or a Voice over Internet Protocol (VoIP) telephone, which would then connect to the network for videoconferencing. As an alternative form of network connection, the videoconferencing unit 60 may include a wireless network interface, such as would comply with one or more of the IEEE 802.11a/b/g standards. Such a module would allow the integrated desktop videoconferencing system 50 to be used in varying locations and/or by a mobile user.

Referring to FIGS. 2-5, an embodiment of an integrated desktop videoconferencing system 100 in accordance with certain teachings of the present disclosure is illustrated in front, side, rear, and top views, respectively. The videoconferencing system 100 includes a display 110, a videoconferencing module 120, and a microphone/camera module 130. The display 110 is preferably a flat panel type personal computer monitor, such as an LCD or plasma display. The videoconferencing module 120 and the microphone/camera module 130 are mounted on the display 110 to form an integrated assembly with the display 110.

Given current size and form factor constraints of the display 110 and electronics technology, it is considered preferable to mount the videoconferencing module 120 to the back of display 110. However, differences or changes in the typical, standard, or available sizes and/or form factors of either the display 110 or the videoconferencing module 120 could result in a situation in which it would be more preferable to attach the videoconferencing module 120 in an alternate position. As illustrated, it is currently considered preferable to attach the microphone/camera module 130 to the top of the display 110. However, as with videoconferencing module 120, differences or changes in the typical, standard, or available sizes and/or form factors of the equipment could present a case in which it would be preferable to attach the microphone/camera module 130 in a different position.

Figure 2:
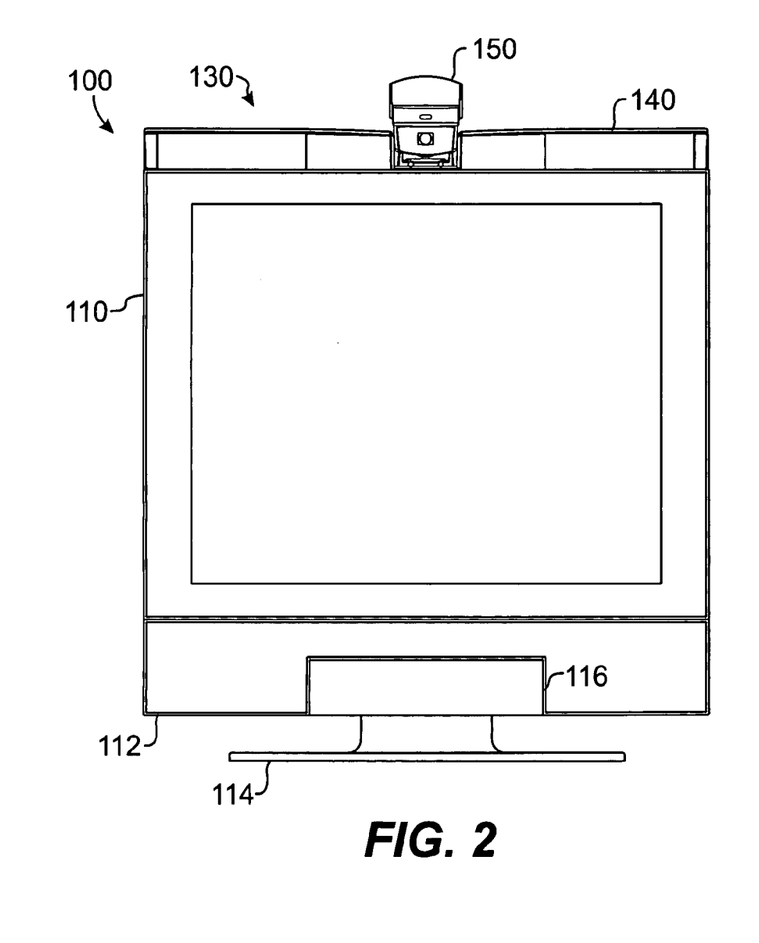
FIG. 2 illustrates a face-on view of an embodiment of an integrated desktop videoconferencing system in accordance with certain teachings of the present disclosure.

As noted above, the display 110 is preferably a standard flat panel display. The display 110 has integral electronics (not shown) within its housing for operating the display 110. Such integral electronics are known in the art and not described herein. Yet, various additional features are preferred for the display 110, and the inventors have found that LCD monitors produced by Sampo Corporation are particularly well suited for use in accordance with the integrated desktop videoconferencing system 100 described herein. One example of a suitable Sampo monitor is the 17" LCD display having model number LME-17S3. Various features are integrated with the Sampo monitors, some of which are particularly advantageous in constructing the videoconferencing system 100 described herein. An example of such a feature is an amplified stereo sound system, including an audio amplifier (not shown) and speakers 112 in the Sampo monitor. Speakers 112 may be positioned in various positions on the display 110, and the speaker grilles are preferably integrated with the display bezel in such a way as to provide a functional, yet attractive system. Additional physical features that are advantageously part of the display 110 are a tilt or tilt/swivel base 114 and an integrated carrying handle 118 (illustrated most clearly in FIG. 6C).

The display 110 preferably includes function buttons (not shown) for controlling various functions of both the display and videoconferencing system. The function buttons are preferably located on the front bezel of the display 110 and may be provided with a cover 116 so that they are covered when not in use. Among the functions controlled by the function buttons are: the display mode (source switch) function, the display setup function, the speaker volume function, and the power switching (on/off) function, described previously with reference to FIG. 1. Moreover, the display 110 can include a VGA input, a VGA output, a VGA source pass-through, an S-Video input, a composite video input, a DVI input, a component video input, and additional features described previously with reference to FIG. 1.

Figure 4:
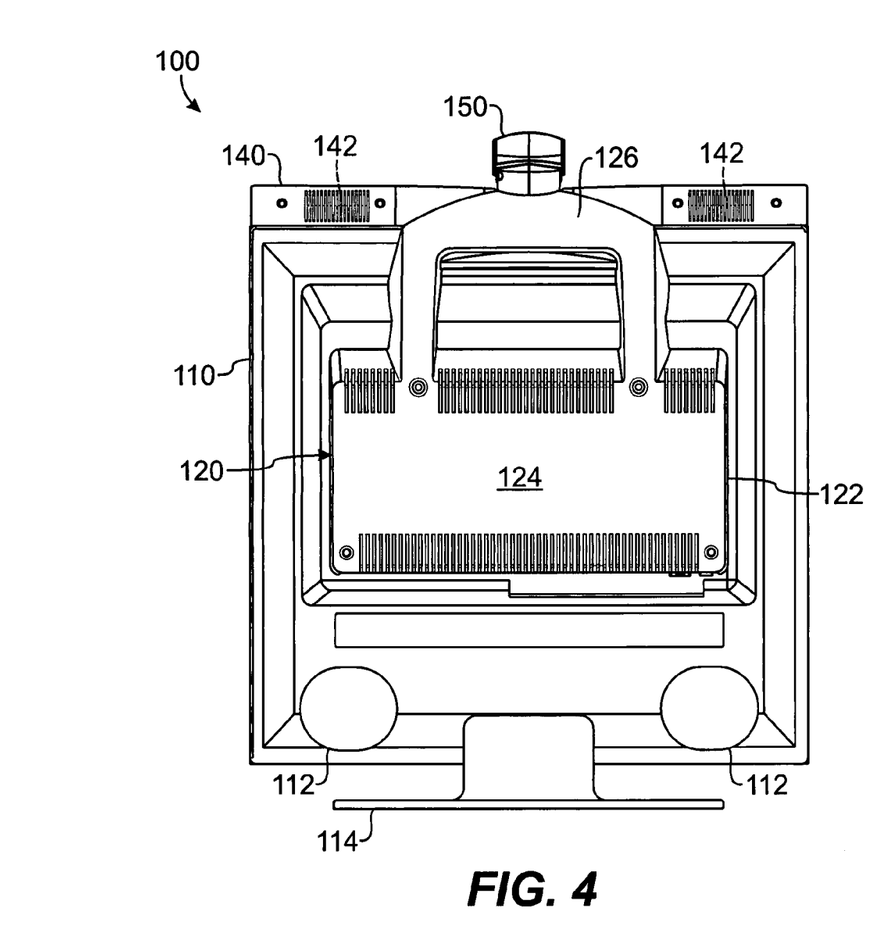
FIG. 4 illustrates a rear view of the videoconferencing system of FIG. 2.

As noted above, the videoconferencing module 120 is mounted on the display 110. As best shown in FIG. 4, the videoconferencing module 120 is attached to the back of the display 110. The videoconferencing module 120 includes an enclosure 122 having a main portion 124 and an intermediate portion 126. The main enclosure portion 124 houses videoconferencing electronics and other components (shown in detail in FIGS. 7A-7B). The intermediate enclosure portion 126 extends from the main portion 124 to the microphone/camera module 130 mounted on top of the display 110. An end of the intermediate portion 126 abuts the microphone/camera module 130, and the intermediate portion 126 hides various connections between electronics of the modules 120 and 130. In one embodiment, the main and intermediate portions 124 and 126 are integrally connected together. In an alternative embodiment, the portions 124 and 126 are separate and attached together by fasteners or the like. The intermediate portion 126 is preferably formed to allow access to an integrated handle 118 (illustrated most clearly in FIG. 6C) of the display 110.

Figure 3:
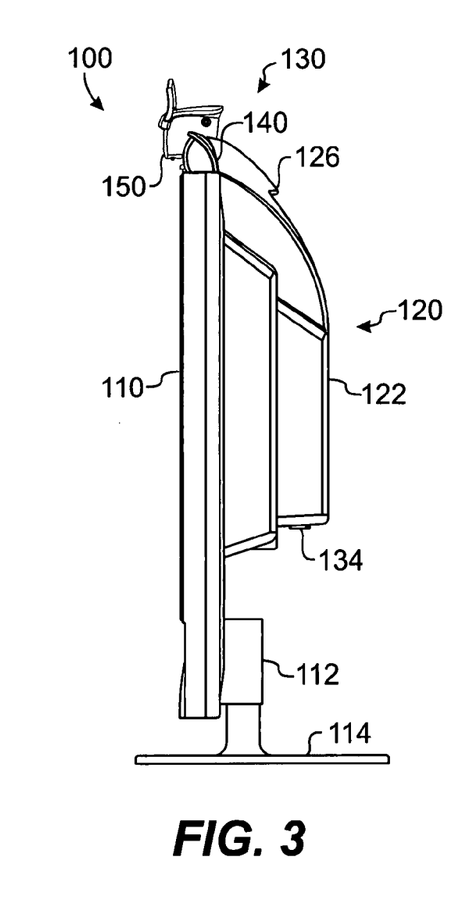
FIG. 3 illustrates a side view of the videoconferencing system of FIG. 2.
Figure 5:
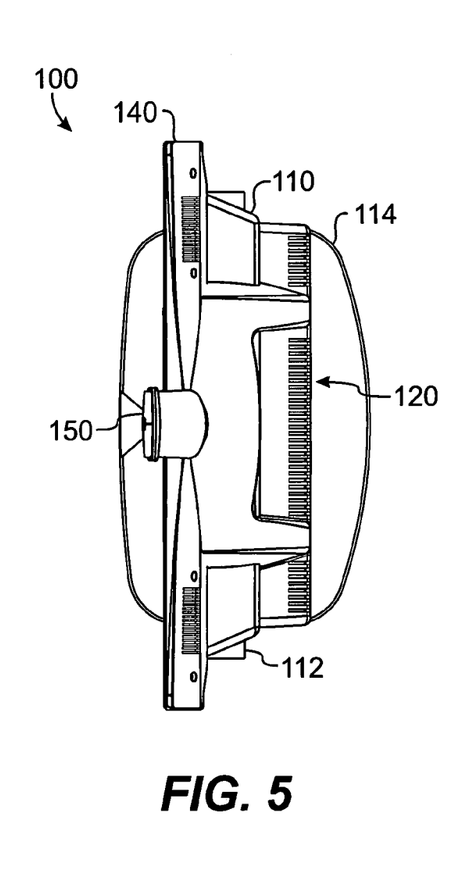
FIG. 5 illustrates a top view of the videoconferencing system of FIG. 2.

The videoconferencing module 120 is designed to be similar in color, materials, and general shape of the display 110 such that the integrated videoconferencing system 100 appears to be a single design. Additionally and as best shown in FIGS. 3-5, the enclosure 122 for the videoconferencing module 120 is preferably designed to be clean looking and to provide an integrated appearance with the display 110 because, as a desktop system, individuals may be sitting behind the display 110. As shown in FIG. 4, the vent pattern on the main enclosure portion 124 is preferably designed to maximize vertical convection so that the vertical convection along with the vertical mounting allows the system 100 to run without a fan.

Figure 6A:
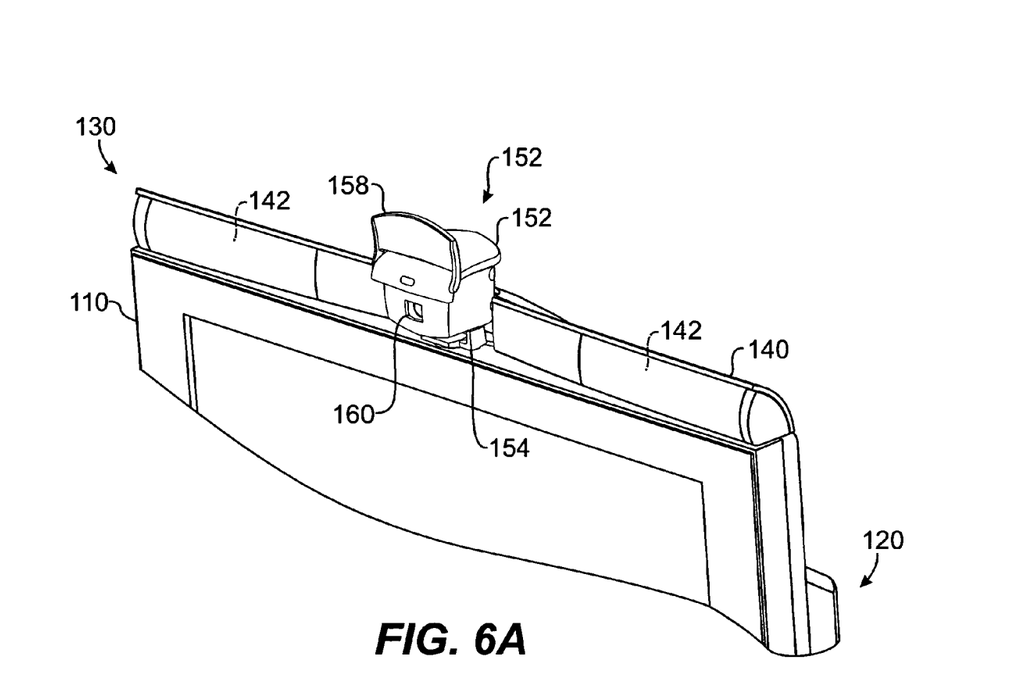
FIGS. 6A-6C illustrate detailed views of a microphone/camera module of the videoconferencing system of FIG. 2.
Figure 6B:
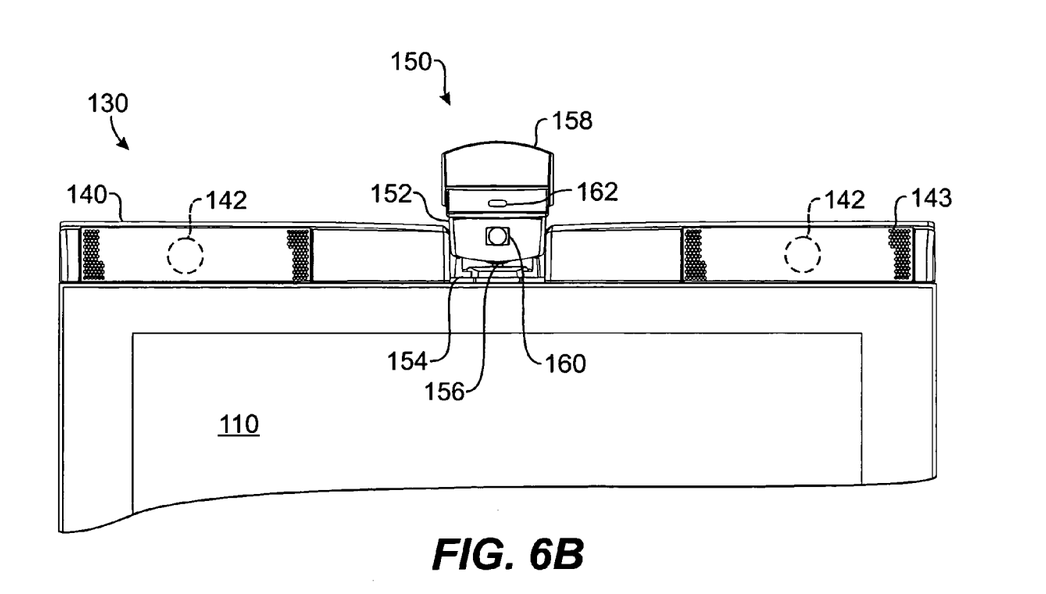
Figure 6C:
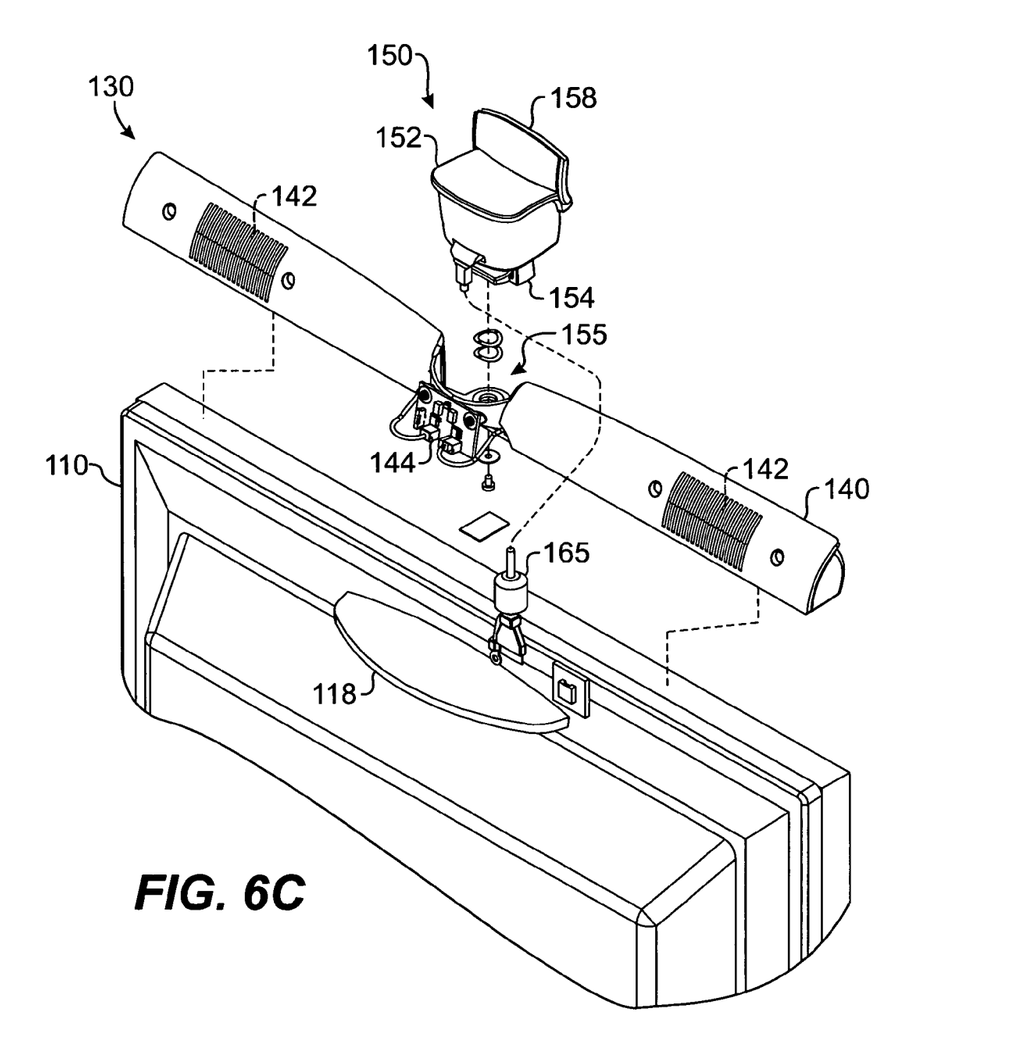

Referring now to FIGS. 6A-6C, the microphone/camera module 130 is illustrated in perspective, face-on, and exploded rear view, respectively. As best shown in FIGS. 6A-6B, the microphone/camera module 130 is designed to fit along the top edge of the flat panel display 110. The microphone/camera module 130 can be attached to the display 110 using various techniques, such as fasteners, clamps, tape, adhesive, etc. The microphone/camera module 130 includes a microphone unit 140 and a camera unit 150. The microphone unit 140 includes a body that houses microphones 142 for the audio portion of a videoconference. The camera unit 150, which is necessary for the video portion of the videoconference, is centrally positioned on the body of the microphone unit 140 so that the microphones 142 are positioned on either side of the camera unit 150.

In the present embodiment, the module 130 integrates the location of the microphones 142 with the camera unit 150. Alternatively, it is possible to provide separate assemblies for the microphone unit 140 and camera unit 150 that attach to the display 110. In any case, the modularized construction of the videoconferencing module 120 and the microphone/camera module 130 enables construction of the integrated desktop videoconferencing system 100 using standard personal computer (PC) type displays, such as the preferred Sampo monitor of the present embodiment. This reduces the development time and cost necessary to produce such a system, which ultimately reduces the cost of the system to the end user. Additionally, if a standard PC monitor is used for the display 110, the integrated desktop videoconferencing system 100 may perform double duty as a personal computer monitor, as described previously.

The microphone/camera module 130 is preferably designed cosmetically to match the materials, shapes, colors, etc. of the display 110 to provide an integrated appearance. For example, grills 143 shown in FIG. 6B cover the microphones 142 housed in the microphone unit 140. These grills 143 are preferably vertically aligned with the grill of the speakers (112; FIG. 2) on the display 110.

The camera unit 150 includes a body 152, which houses an electronic camera (not shown) and has an opening for a lens 160 of the camera to capture images for videoconferencing. In the disclosed embodiment, the camera unit 150 has a manual pan/tilt mechanism 154 that attaches the body 152 to the microphone unit 140. As best shown in FIG. 6C, the manual pan/tilt mechanism 154 is attached to a central location 155 of the microphone unit 140 with a fastener and washers, and the mechanism 154 allows the camera body 152 to pan and tilt. Preferably, the camera body 152 is allowed to pan and tilt about +/−20-degrees. In an alternative embodiment, however, the camera unit 150 can have an electrically driven pan and tilt mechanism or can have electronic pan and tilt capabilities, such as described previously. Additionally, manual electric or electronic zoom capabilities may also be provided.

As best shown in FIG. 6C, a connector 165 connects the camera unit 150 to other electronics (not shown) of the system. As best shown in FIGS. 6A-6B, the camera unit 150 also preferably incorporates a privacy shutter 158, which may be manually or electrically actuated to conceal or expose the lens 160. An infrared detector 162 is also housed in the camera unit 150 and is preferably visible whether the shutter 158 is open or closed. This infrared detector 162 when used with a remote control can be used to control various functions of the display 110 and/or videoconferencing system. As best shown in FIG. 6B, a manual focus wheel 156 on the camera unit 150 allows the user to focus the camera without needing to touch the lens 160 when the camera unit 150 is in operation. Alternatively, electric manual focusing or automated focusing may also be provided. The camera unit 150 can also support an electronic zoom capability, although cameras with normal optical zoom capabilities may also be included.

As for the microphone unit 140 of the microphone/camera module 130, each microphone 142 is preferably a cardioid microphone angled at about 20-degrees towards the central location 155 of the module 130 to maximize the stereo pickup of the system 100. The cavity for the microphones 142 and the placement of the microphones 142 are shaped to maximize the pickup of the cardioid microphones 142 on each side. As shown in FIG. 6C, an electronic unit 144 coupled to the microphones 142 is attached to the back of the central location 155 of the unit 140. This electronic unit 144 is used for processing audio signals and is coupled to other electronics (not shown) of the videoconferencing system. This electronic unit 144 is covered by the end of the intermediate enclosure portion (126; FIG. 4) so that it is not visible when the system is assembled.

Figure 7A:
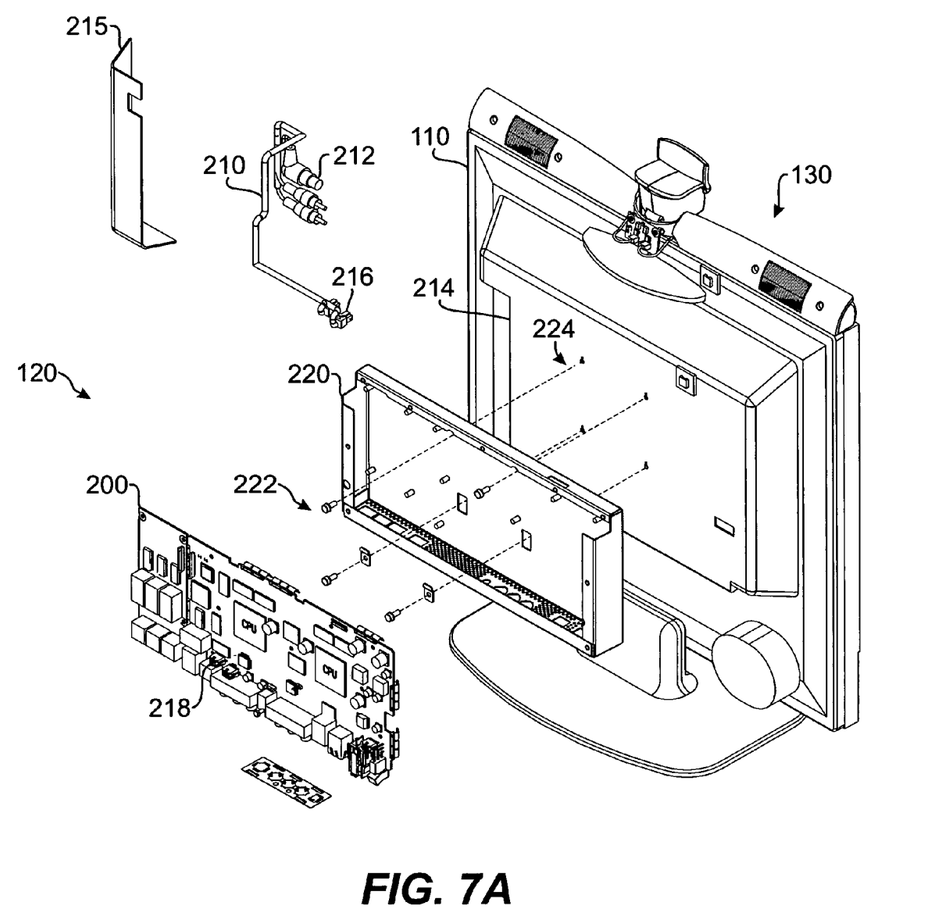
FIGS. 7A-7B illustrate exploded rear views of the videoconferencing system of FIG. 2.
Figure 7B:
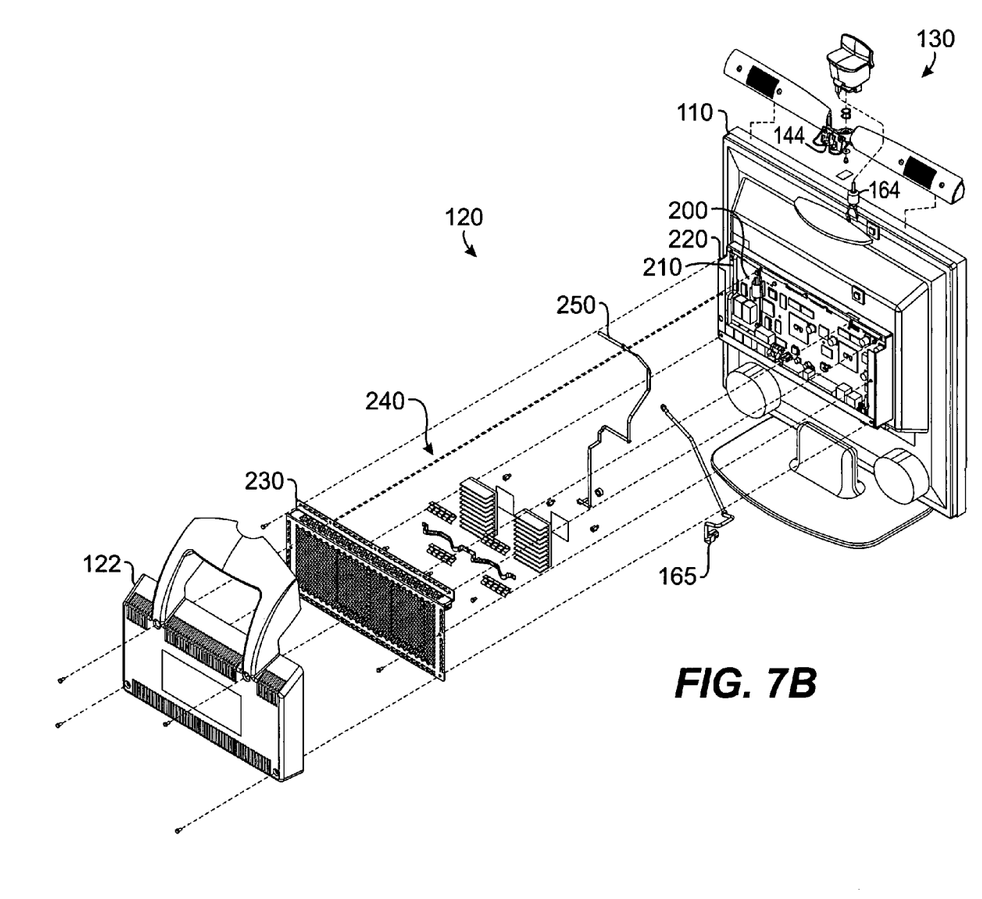

Referring now to FIGS. 7A-7B, further details of the system 100 will be discussed. As best shown in FIG. 7A, the vertically orientated videoconferencing module 120 is preferably attached to the display 110 via the standard mounting hole pattern 224 according to the Video Electronics Standards Association (VESA) on the back of the display 110. This arrangement has numerous advantages, such as allowing for conversion of a standard computer monitor type display with minimal custom tooling and allowing for wall mounting of the integrated videoconferencing system 100 using standard brackets, including various tilt/swivel arrangements.

As shown in FIG. 7A, the videoconferencing module 120 includes an electronics module 200 and an electronics tray 220. The electronics module 200 contains all the necessary electronics for a videoconferencing system, including processors, memory, communication interfaces (LAN/WAN/ISDN), etc. Construction and implementation of such electronics for videoconferencing systems are known to those skilled in the art, thus the details are not reproduced here.

The electronics tray 220 mounts to the back of the display 110 with fasteners 222 connecting to the VESA mounting holes 224 of the display 110. At least two of the fasteners 222 allow for adjustment of the tray 220. The electronics module 200 mounts in the tray 200 with fasteners (not shown). In the present embodiment, a connector 210 has multiple connection members on one end 212, which connect to inputs 214 on the display 110. A cover 215 may be used to hide the connector end 212. The connector 210 also has connectors on another end 216, which connects to outputs 218 on the electronics module 200 so that video and audio signals can be transmitted from the electronics module 200 to the display 110.

As shown in FIG. 7B, the camera unit 150 connects to the electronics module 200 with connector 164 and cable 165, and the microphone electronic unit 144 connects to the module 200 with a cable 250. The videoconferencing module 120 also includes a cage member 230, heat sinks 240, and the enclosure 122. With the electronics module 200 and tray 220 mounted to the display 110 as shown in FIG. 7B and described previously, the heat sinks 240 mount to the electronics module 200, and the cage member 230 attaches to the electronics tray 220 to protect the module 200. Finally, the enclosure 122 attaches with fasteners to the electronics tray 220 to complete the assembly. Once the module 120 is assembled, the electronic module 200, connector 210 between the electronic module 200 and the display 110, the microphone electronic unit 144, and other components, cables, and connectors are hidden under the enclosure 122.

The disclosed integrated desktop videoconferencing system has been explained with reference to exemplary embodiments. It will be evident to those skilled in the art that various modifications may be made thereto without departing from the broader spirit and scope of the invention. Further, although the invention has been described in the context of its implementation in particular environments and for particular applications, those skilled in the art will recognize that the present invention's usefulness is not limited thereto and that the invention can be beneficially utilized in any number of environments and implementations. The foregoing description and drawings are, accordingly, to be regarded in an illustrative rather than a restrictive sense.

What is claimed is:

1. A videoconferencing system, comprising:
a flat panel display including a display housing that surrounds at least part of the flat panel display, and further including display electronics;
videoconferencing electronics electronically connected to the display electronics, at least part of the videoconferencing electronics surrounded by a first housing; a camera attached to the flat panel display and electronically connected to the videoconferencing electronics; and
a microphone attached to the flat panel display and electronically connected to the videoconferencing electronics;
wherein the videoconferencing electronics are mechanically integrated with the flat panel display by attachment of at least one exterior surface of the first housing to at least one exterior surface of the display housing.

2. The system of claim 1, wherein the flat panel display comprises a desktop computer monitor.

3. The system of claim 1, wherein the flat panel display further comprises at least one audio amplifier and at least one speaker.

4. The system of claim 1, further comprising a dialing pad for placing video and/or audio calls and electronically connected to the videoconferencing electronics.

5. The system of claim 1, wherein the videoconferencing electronics comprise a network interface, a LAN interface, an ISDN interface, a telephone interface, a Voice over Internet Protocol telephone interface, or a wireless interface.

6. The system of claim 1, wherein the videoconferencing electronics are housed in a first module at least part of which is also surrounded by the first housing, the first module attached to the flat panel display.

7. The system of claim 6, wherein the first module attaches to the back of the display housing.

8. The system of claim 7, wherein the back of the display housing includes one or more mounting holes in standardized locations, and wherein the first module attaches to the one or more mounting holes with fasteners.

9. The system of claim 8, wherein the camera and the microphone are housed in a second module attached to the flat panel display.

10. The system of claim 9, wherein the camera comprises a pan/tilt mechanism coupling the camera to the second module.

11. The system of claim 9, wherein the second module comprises an infrared detector electronically connectable to the videoconferencing electronics.

12. The system of claim 9, wherein the second module comprises one or more microphones angled toward a front of the display.

13. The system of claim 1, wherein the color and materials of the first housing and the display housing are substantially the same and provide an integrated appearance of the attached housings.

14. A videoconferencing system for equipping a flat panel display to conduct a video conference, the flat panel display having integral electronics, the system comprising:
- a first module surrounded at least in part by a first module housing, an exterior surface of the first module housing configured to be mechanically attached to an exterior surface of a display housing surrounding the flat panel display, the first module including videoconferencing electronics adapted for electrical connection to the integral electronics of the flat panel display; and
- a second module configured to be mechanically attached to the flat panel display, the second module including a camera and a microphone adapted for electronic connection to the videoconferencing electronics.

15. The system of claim 14, wherein the flat panel display comprises a desktop computer monitor.

16. The system of claim 14, wherein the flat panel display further comprises at least one audio amplifier and at least one speaker.

17. The system of claim 14, further comprising a dialing pad for placing video and/or audio calls and electronically connected to the videoconferencing electronics.

18. The system of claim 14, wherein the videoconferencing electronics comprise a network interface, a LAN interface, an ISDN interface, a telephone interface, a Voice over Internet Protocol telephone interface, or a wireless interface.

19. The system of claim 14, wherein the first module housing attaches to the back of the display housing.

20. The system of claim 19, wherein the back of the display housing includes one or more mounting holes in standardized locations, and wherein the first module housing attaches to the one or more mounting holes with fasteners.

21. The system of claim 14, wherein the camera comprises a pan/tilt mechanism coupling the camera to the second module.

22. The system of claim 14, wherein the second module comprises an infrared detector electronically connectable to the videoconferencing electronics.

23. The system of claim 14, wherein the second module comprises one or more microphones angled toward a font of the display.

24. The system of claim 14, wherein the color and materials of the first module housing and the display housing are substantially the same and provide an integrated appearance of the attached housings.

* * * * *

UNITED STATES PATENT AND TRADEMARK OFFICE
CERTIFICATE OF CORRECTION

PATENT NO. : 7,593,031 B2  
APPLICATION NO. : 11/108015  
DATED : September 22, 2009  
INVENTOR(S) : Root et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1165 days.

Signed and Sealed this

Twenty-first Day of September, 2010

David J. Kappos  
*Director of the United States Patent and Trademark Office*